UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

BROWN AZO DYE.

SPECIFICATION forming part of Letters Patent No. 628,814, dated July 11, 1899.

Application filed February 8, 1899. Serial No. 704,951. (No specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in the Manufacture of Brown Azo Color, (for which patents have been obtained in Germany, No. B 23,834, dated December 1, 1898; in England, No. 211, dated January 4, 1899, and in France, No. 272,643, dated January 7, 1899,) of which the following is a specification.

I have discovered that new brown azo coloring-matter can be obtained by the combination of diazo compounds of nitro-amido-phenol-sulfoacids with meta-phenylene-diamin. The nitro-amido-phenol-sulfoacids which are used for this invention are the ortho-nitro-ortho-amido-phenol-para-sulfoacid and the para-nitro-ortho-amido-phenol-ortho-sulfoacid. The new coloring-matter obtained upon using either of these nitro-amido-phenol-sulfoacids dyes wool from the acid bath, giving deep-brown shades, and these on treatment with chromates are darkened to deep brown to black brown. The colors so obtained are as fast as those obtained by the ordinary alizarin coloring-matters. They resist milling, washing, rubbing, and the action of sulfurous fumes, steam, and carbonizing and possess an extraordinary fastness against the action of light.

The following example will serve to further illustrate the manner in which my invention is best carried into practical effect:

Example: Dissolve one hundred and seventeen parts of nitro-amido-phenol-sulfoacid, hereinbefore defined, in five hundred parts of water, to which one hundred and fifteen parts of caustic soda lye (containing about thirty-five per cent. NaOH) have been added. Add a solution of about thirty-four and a half parts of sodium nitrite, and run this mixture while continuously stirring into a dilute hydrochloric-acid solution, made up of about two hundred and twenty parts of hydrochloric acid (containing about thirty per cent. real H.Cl) and five hundred parts of water. The diazotation is complete in a few minutes. Test the liquid for nitrous acid, which must not be present, and then run the diazo solution into a solution of about ninety-five parts of meta-phenylene-diamin-hydrochlorate in one thousand parts of water, containing also about three hundred parts of crystallized sodium acetate. Stir for about four hours, when the combination is usually completed. The coloring-matter separates out completely. Filter, press, and dry. The new coloring-matter thus obtained is a powder, which may possess a reddish-brown color or even a dark-green appearance. It is soluble in cold water, but readily soluble in a dilute solution of sodium carbonate. The solution in concentrated sulfuric acid is yellow red to yellow brown.

My new coloring-matter is particularly characterized by yielding nitro-amido-phenol-sulfoacid, as hereinbefore defined, on reduction with ammonium sulfid in ammoniacal solution. This test can be suitably effected as follows: Dissolve the product in a large excess of aqueous ammonia. Boil the solution and add ammonium-sulfid solution. Continue the boiling, replacing the ammonia that evaporates and renewing the addition of the ammonium sulfid, for about twenty minutes to half an hour. When the reduction is complete, a spot of the solution on filter-paper on treating with hydrochloric acid no longer becomes orange yellow, but is nearly colorless. When this point is reached, boil to get rid of the excess of ammonium sulfid and allow the solution to cool, acidify with hydrochloric acid, and filter. The solution so obtained contains the nitro-amido-phenol-sulfoacid. It can be recognized by diazotizing by the addition of a solution of sodium nitrite and combining the diazo solution so obtained with an alkaline solution of R salt. The coloring-matter formed is violet blue to blue.

Now what I claim is—

The new brown coloring-matter which is chemically the monoazo-dyestuff of nitro-amido-phenol-sulfoacid and meta-phenylene-diamin, and which is soluble in cold water, readily soluble in a dilute solution of sodium carbonate, and gives a yellow-red to yellow-brown solution in concentrated sulfuric acid; and on reducing the coloring-matter with ammonium sulfid in boiling ammoniacal solution, it yields nitro-amido-phenol-sulfoacid, substantially as described.

In testimony whereof I have hereunto set my hand in the presence of two subscribing witnesses.

PAUL JULIUS.

Witnesses:
ERNEST F. EHRHARDT,
HOWARD E. J. INGLEY.